UNITED STATES PATENT OFFICE.

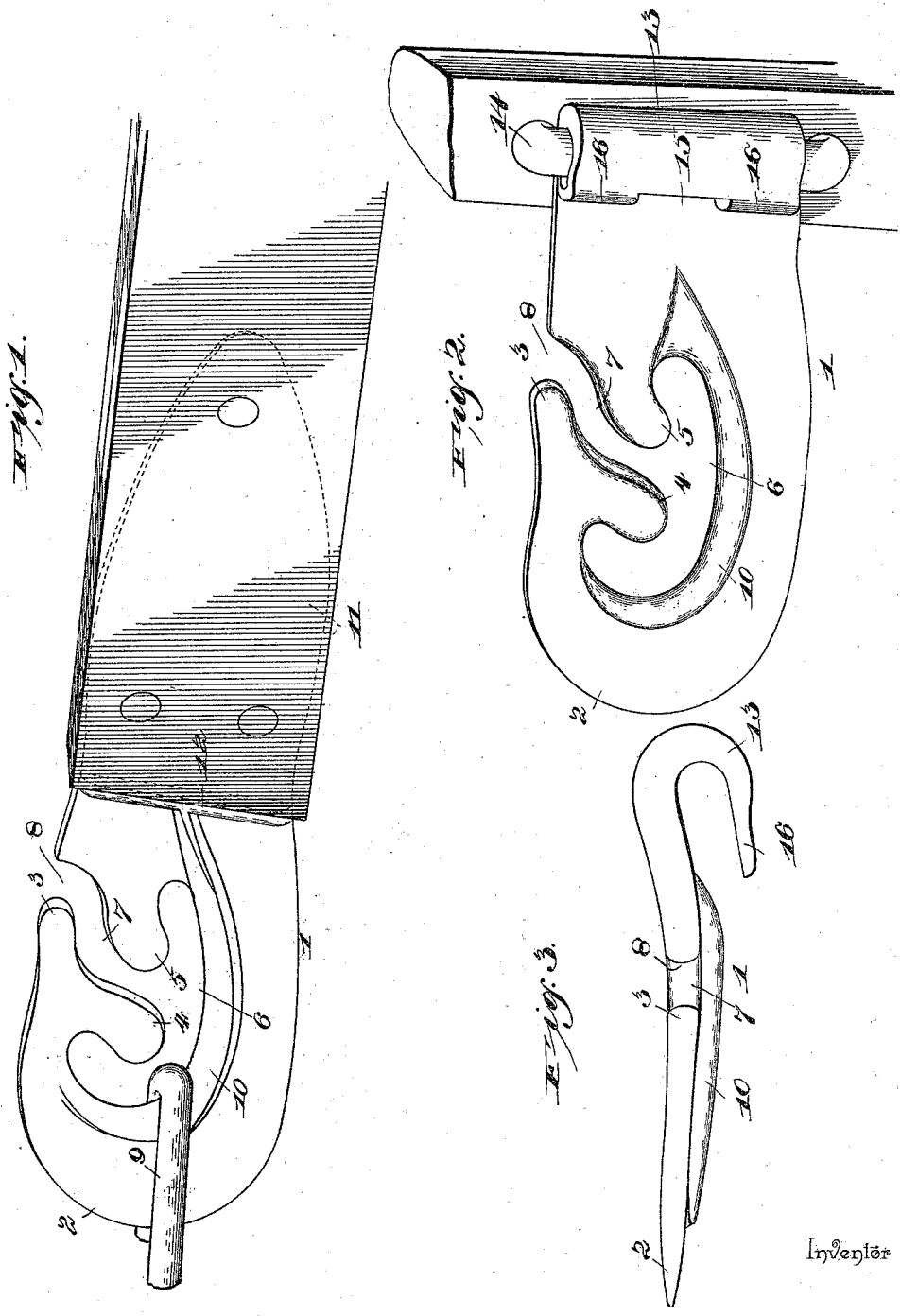

JOHN W. BECKWITH, OF GALT, CALIFORNIA.

TRACE OR HAME HOOK.

SPECIFICATION forming part of Letters Patent No. 554,228, dated February 11, 1896.

Application filed March 13, 1895. Serial No. 541,611. (No model.)

*To all whom it may concern:*

Be it known that I, JOHN W. BECKWITH, a citizen of the United States, residing at Galt, in the county of Sacramento and State of California, have invented a new and useful Trace or Hame Hook, of which the following is a specification.

This invention relates to an improvement in hooks, being especially designed for connecting the traces with the whiffletree or for connecting the hames.

The object of my invention is to provide a simple and inexpensive hook made or cast in a single piece and afterward annealed, which shall be durable in practice, easy to manipulate, and thoroughly effectual in preventing the disengagement of the parts connected by the same.

The invention consists in the peculiar form, construction, and arrangement of parts, and other details, as hereinafter fully described, illustrated in the drawings, and pointed out in the claim.

In the accompanying drawings, Figure 1 is a perspective view of my improved hook shown applied to the end of a trace. Fig. 2 is a similar view of the hook shown applied to a hame. Fig. 3 is an edge view of the hook shown in Fig. 2.

Similar numerals of reference indicate corresponding parts in the several figures of the drawings.

Referring to the drawings, 1 indicates the main body of the hook, 2 the curved end portion thereof, and 3 the forwardly-projecting point or extremity of the hook. The forwardly-extending portion 3 of the hook is provided with an inwardly-extending guard-finger 4, and a similar guard-finger 5 projects inwardly and rearwardly from the main body of the hook, as shown. By the formation and arrangement just described an elongated and curved opening 6 is formed, with an ogee channel or opening 7 leading therefrom past the point of the hook 3, and forming a mouth 8 opening downward. The channel or opening 7 and mouth 8 are purposely made narrow, only a trifle wider than the diameter of the material from which the hook 9 is formed, while the opening or channel 6 is made appreciably wider than the diameter of the hook or link 9, in order that the latter may move freely back and forth through the opening 6 and lengthwise thereof without the liability of its passing upward through the ogee opening 7. The wearing edge of the main body of the hook 1 is provided on either side with a rounded flange 10, the purpose of which is to give increased wearing-surface for the link 9. The flange 10 may be extended around the curved end portion 2 of the hook where the wear is the greatest when strain is put on the traces. The hook is also provided with a forwardly-extending tongue 11, provided with suitable perforations, whereby the same is riveted to the end of a trace in any convenient manner. A vertical rib 12 helps to strengthen the hook and forms a flange against which the end of the trace may abut, as indicated in Fig. 1. The flange 10 is preferably extended forward to meet the flange or rib 12 for further strengthening the hook.

The hook above described is specially adapted for use in attaching traces to a whiffletree. In Figs. 2 and 4 and also Fig. 5 I have shown how the hook may be adapted for use in connection with the hames for fastening the same. In this construction the flange 10 instead of projecting on both sides of the hook is omitted from the inner side next to the animal, so as to leave said inner surface smooth to prevent injuring the collar. Instead of the tongue 11 a hook 13 is formed in the corresponding end of the hook, which is adapted to pass around the loop or staple 14 in the side of one of the hames, and the point of the hook 13 is cut out, as shown at 15, leaving malleable lips 16, which are adapted to be bent down around the staple 14 for securing the parts together, as shown in Fig. 2.

By projecting both of the guard-fingers 4 and 5 toward or in the direction of the main body of the hook, no matter in what direction the link 9 may be moving with relation to the hook, or the hook with relation to the link, the link cannot escape through the ogee channel and from the hook. While the hook and the link are in engagement, the link rests in one of the deflected ends of the longitudinal slot of the hook, and when the link is suddenly thrust to the opposite end of the longitudinal slot it will pass by the guard-fingers 4 and 5 and enter and rest in the opposite deflected end portion of the longitudinal slot. The hook thus possesses all the advantages of a snap-hook while being much cheaper in manufacture.

The hook above described may be made of any suitable material, but it is preferred to form the same from malleable iron or other metal which will give the requisite toughness to the hook.

Having thus described the invention, what I claim is—

The herein-described trace and hame hook, comprising a main body portion or back 1, a curved end portion 2, a longitudinally-extending point 3, and two integrally-formed guard-fingers 4 and 5 projecting inwardly in substantially the same direction or toward the back or body portion of the hook but terminating at such points as to leave a longitudinal slot extending lengthwise of the hook, the adjacent edges of said guard-fingers being curved correspondingly and arranged in parallel relation, whereby a sinuous ogee-shaped entrance-channel is provided which communicates with the longitudinal slot, and the end portions of said slot deflected, for preventing the accidental escape of the link or other device inserted therein, substantially as described.

In testimony that I claim the foregoing as my own I have hereto affixed my signature in the presence of two witnesses.

JOHN W. BECKWITH.

Witnesses:
E. H. METZNER,
S. M. FULTON.